United States Patent [19]

Shotwell

[11] 4,417,507

[45] Nov. 29, 1983

[54] SHRIMP PROCESSING SYSTEM

[76] Inventor: Jesse A. Shotwell, P.O. Box 414, Bay Center, Wash. 98527

[21] Appl. No.: 310,041

[22] Filed: Oct. 9, 1981

[51] Int. Cl.³ .............................................. A47J 27/16
[52] U.S. Cl. ........................................... 99/352; 17/73; 99/355; 99/443 C; 99/470; 99/404; 126/369; 426/523; 426/643
[58] Field of Search ...................... 99/443 C, 352, 355, 99/470, 477, 404; 426/523, 478, 643; 17/73; 126/369

[56] References Cited

U.S. PATENT DOCUMENTS 3,276,878 10/1966 Lapeyre ............................. 17/73 X
3,975,797 8/1976 Grimes et al. ........................ 17/73

Primary Examiner—Billy J. Wilhite
Attorney, Agent, or Firm—Cole, Jensen & Puntigam

[57] ABSTRACT

A feed tank portion (11) of a conventional shrimp processing apparatus is divided into forward (35) and rear (33) sections by an intermediate baffle (31), which extends across the full width of the feed tank (11). The baffle (31) is configured so that the rear tank section (33) can function as a feed tank for raw shrimp for the processing apparatus. A feed belt (17) moves the raw shrimp out of the rear tank section (33) to a cooker (23). The warm condensate liquid from the cooker (23) and water at ambient temperature from the sprinklers (27) at the upper end of the feed belt (17) runs off into the forward tank section (35). The water in the rear tank section (33) is continuously recirculated and maintained at a desired low temperature, with a specific concentration of chemicals, such as phosphate, if desired.

6 Claims, 10 Drawing Figures

SHRIMP PROCESSING SYSTEM

DESCRIPTION

1. Technical Field

The invention relates primarily to the shrimp processing art, and more specifically concerns improvements to the feed tank portion of shrimp cooking/peeling machines.

2. Background Art

In a typical shrimp processing system, whole raw shrimp are placed in a water-filled feed tank, from where they are carried by a feed belt to a steam cooker, and from there to a peeler. Sprinklers are typically used to clear debris from the feed belt. The warm liquid condensate from the steam cooker, and the ambient run-off liquid from the sprinklers typically mix with the water in the feed tank, due to the arrangement of the system. Excess liquid in the feed tank is periodically drained off.

It is now known that the percentage of shrimp meat recovered by a given processing system may be significantly increased by maintaining the water bath for the shrimp in the feed tank at a relatively low temperature, and by maintaining a specific concentration of phosphate in the water bath. The above-described typical shrimp processing system thus is unsatisfactory because the constant addition of warm liquid from the sprinklers and the steam cooker to the water in the feed tank raise the temperature of that water from the desired low temperature, and dilute the chemical concentration. It is not now practical, moreover, to continuously cool the water in the feed tank and to continue to add the desired chemicals to maintain the chemical concentration at the desired level, to overcome the effect of the additional warm liquid.

Accordingly, it is a general object of the present invention to provide an improvement to the feed tank portion of conventional shrimp processing apparatus which overcomes one or more of the disadvantages present in the prior art discussed above.

It is another object of the present invention to maintain the water bath in the feed tank at a desired low temperature.

It is a further object of the present invention to maintain the concentration of phosphate or other chemical in the water bath of the feed tank at a desired level.

It is an additional object of the present invention that it can be used with existing shrimp processing apparatus, without extensive modification thereof.

DISCLOSURE OF THE INVENTION

Accordingly, the present invention is a modification of the feed tank of a shrimp processing apparatus. A dividing means separates the feed tank into forward and rear tank sections, with the dividing means being positioned so that the rear tank section has a sufficient capacity to function as a feed tank for the apparatus and so that any liquid condensate from the shrimp cooker and substantially any other liquid runoff which is not treated collects in the forward tank section, from where it may be drained. This prevents such liquid from mixing with the water in the rear tank section. Means are provided for treating the water in the rear tank section so that the water has at least one of the following characteristics: (a) a selected temperature which is lower than ambient and (b) a desired concentration of a selected chemical. The corresponding method comprises the steps of establishing a feed tank which contains water, treating the water so that the water has at least one of the following characteristics: (a) a selected temperature which is lower than ambient and (b) a desired concentration of a selected chemical, and then preventing untreated liquid, such as condensate, from mixing with the water in the feed tank.

BEST MODE FOR CARRYING OUT THE INVENTION

Figure 1:
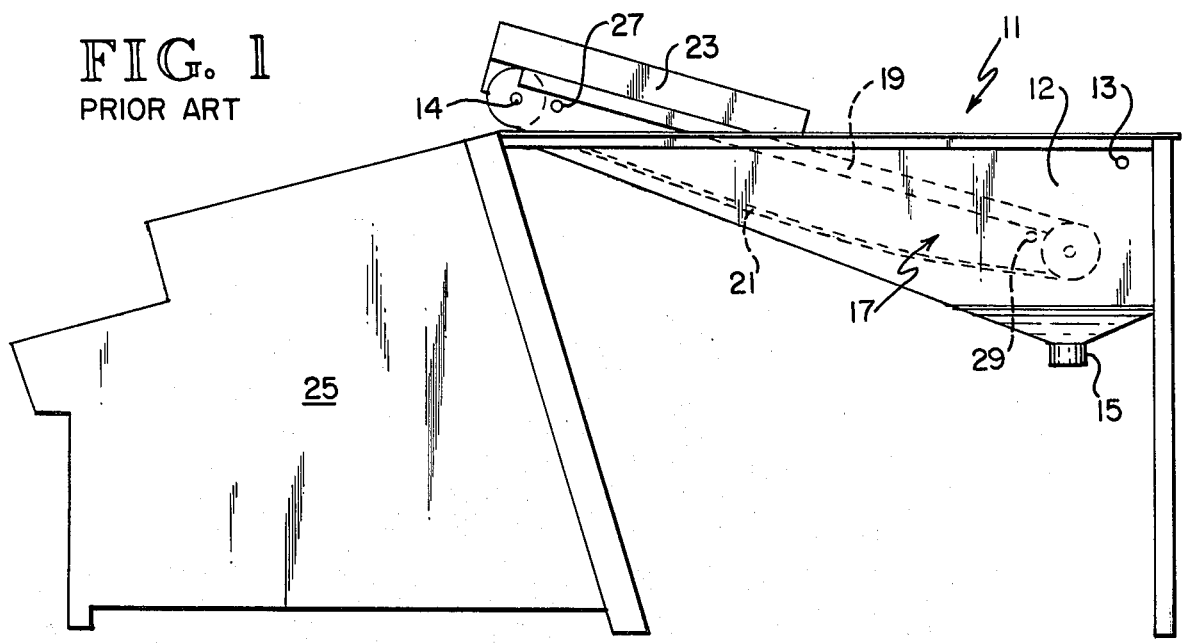
FIG. 1 is a simplified side elevation view of the shrimp processing apparatus of the prior art.

A prior art shrimp processing system, using Laitram or Skrmetta shrimp peelers, is shown in FIG. 1. In such a system, the raw whole shrimp are initially placed into a feed or holding tank, shown generally at 11, which is filled with water. The feed tank 11 is approximately 23 inches deep at its rear end 12. The bottom of tank 11 tapers upwardly from the rear end 12 to the front end 14, the front end 14 of tank 11 being typically quite shallow. Water may be added to feed tank 11 through inlet 13, and drained through outlet 15 located at the bottom of the feed tank near the rear end thereof.

The raw shrimp in the feed tank are carried out of the water bath by a feed belt 17 having an upper run 19 and a lower run 21. Feed belt 17 is supported by a belt frame and extends from near the bottom of the feed tank at its rear end 12 to slightly beyond the forward end of the feed tank. The rear end of feed belt 17 is thus in the water bath, while the front end is out of the water. The upper and lower runs of feed belt 17 are generally parallel to the tapered bottom of the feed tank.

The raw shrimp are carried by feed belt 17 to a conventional steam cooker 23 which substantially encloses the upper run 19 of the feed belt near the forward end of the belt. An example of such a conventional steam cooker is shown in U.S. Pat. No. 3,975,797 to Grimes et al. The shrimp are then steam-cooked as they pass through cooker 23 on the upper run 19 of feed belt 17. Typically, feed belt 17 moves quite slowly, less than 3 feet per minute, permitting a thorough steam cooking of the shrimp. After the shrimp pass out of cooker 23, they drop off the forward end 14 of feed belt 17, into a peeler 25, which is not considered to be a part of the present invention.

Two sets of sprinklers are provided for use with feed belt 17. An upper set of sprinklers 27 is located near the forward end 14 of feed belt 17, slightly below the upper run 19. Sprinklers 27 help to clear the upper surface of the lower run 21 of shrimp debris. A lower set of sprinklers 29 is located near the rear end of the feed belt. Sprinklers 29 also spray the lower run of the belt. Thus, the two sets of sprinklers 27 and 29 continuously maintain the lower run 21 of the feed belt clear.

Figure 2:
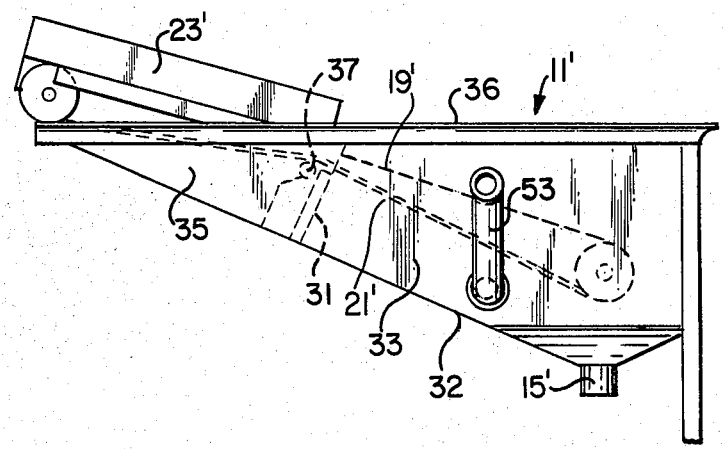
FIG. 2 is a simplified side elevation view of the feed tank portion of the apparatus of FIG. 1, modified in accordance with the principles of the present invention.
Figure 3:
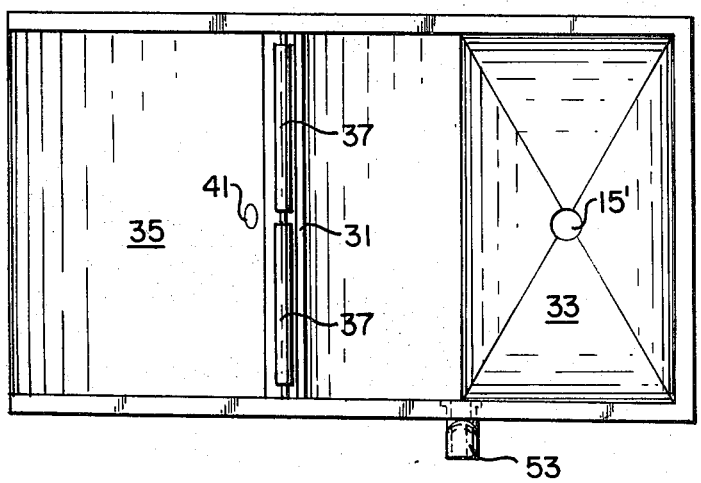
FIG. 3 is a plan view of the apparatus of FIG. 2.

FIGS. 2 and 3 show, in simplified form, the apparatus of the present invention, which is shown and described herein as a modification of existing feed tank apparatus, such as shown in FIG. 1 and described above. However, the present invention can be incorporated as part of original equipment feed tank apparatus as well.

Referring now specifically to FIGS. 2 and 3, a baffle 31 is positioned within feed tank 11', at a point which is approximately mid-length of the feed tank. In the embodiment shown, baffle 31 is positioned so that it is perpendicular to the bottom surface 32 of feed tank 11', and extends across the complete width of the feed tank, thereby effectively dividing the feed tank 11' shown in FIG. 1 into rear and forward feed tank sections 33 and 35. The baffle 31 is constructed and installed in a manner to insure a watertight fit, to prevent movement of liquid between feed tank sections 33 and 35.

More specifically, in the embodiment shown, baffle 31 is positioned so that if it is projected upwardly beyond its actual height, it will intercept the top edge 36 of the feed tank approximately 48 inches from the rear edge of the tank. The actual height of the baffle will vary somewhat, but typically will terminate approximately 4½ inches below the top edge 36 of the feed tank. The top edge of the baffle will thus be typically slightly below the rear edge of the steam cooker 23'. With this arrangement, the level of the water bath in rear tank section 33 will be slightly lower than the water level in the original single feed tank. However, this slight lowering of the level of the water bath has no adverse effect on the operation of the apparatus.

The position of the baffle 31 as shown and described will necessarily raise the lower run 21' of the feed belt, at a point approximately midlength of the run. This necessitates the use of a roller 37, which is positioned at the upper forward edge of the baffle and which extends substantially the width of the feed tank. With such a structure, there will typically be approximately 1½ inches of clearance between the upper and lower runs of the feed belt, in the vicinity of roller 37. The bottom surface of the lower run slides over the surface of roller 37, but, due to the feed belt moving at a relatively slow rate, the contact between the lower run 21' and roller 37 typically will have no adverse impact on the operation of the apparatus. In some applications, the support structure for the feed belt will need to be altered somewhat, but this depends upon the particular apparatus on which the invention is used, and is within the ordinary skill in the art.

Figure 4:
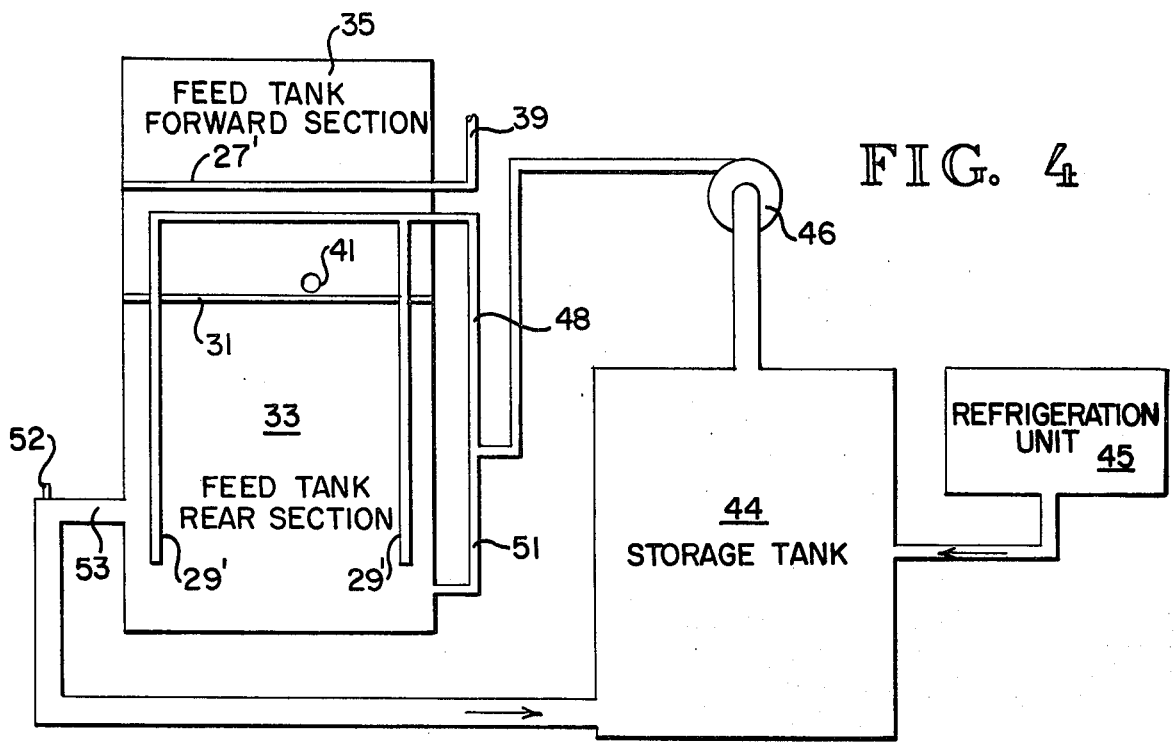
FIG. 4 is a block diagram showing the water circulation system for the apparatus of FIGS. 2 and 3.

In addition to the structural changes shown and described above, the water circulation system of the conventional holding tank system shown in FIG. 1 has been modified, in order to insure that the water in the rear tank section 33 is maintained at a low temperature, and/or with a given level of desired chemicals, such as phosphates. FIG. 4 shows the water circulation system of the present invention. Water at ambient temperature is supplied to the upper sprinklers 27' through feed line 39, which is similar to the conventional arrangement.

The liquid runoff from the upper sprinklers and the condensate from the steam cooker is contained in the forward tank section 35, from where it may be removed through drain 41 for disposal. Hence, the ambient temperature water from the upper sprinklers and the warm condensate from the steam cooker is kept separate from the water in the rear tank section 33, in which the raw shrimp are held.

The water recirculation system shown in FIG. 4 for rear tank section 33 is a closed system. The system includes a storage tank 44 and a refrigeration unit 45 for cooling the water in the storage tank to the desired temperature. Desired chemicals, such as phosphates, may be conveniently added to the water in storage tank 44.

A pump 46 moves the cool water from storage tank 44 into a lower sprinkler feed line 48 and also into the rear tank section feed line 51. In the embodiment shown, but not necessarily, the liquid run-off from the lower sprinklers 29' mixes with the water in the rear tank section. Thus, all of the water in the rear tank section 33 is at the desired low temperature and/or has the desired level of phosphates. Water is continuously drained from the rear tank section through outlet 53, which in the embodiment shown is a standpipe, from where it is returned to the storage tank 44 for further cooling. A conventional siphon breaker 52 may be positioned at the upper end of the outlet 53 to prevent any unexpected emptying of the rear tank section 33. In some embodiments, a single storage tank may serve several machines, requiring additional lines from pump 46.

Figure 5:
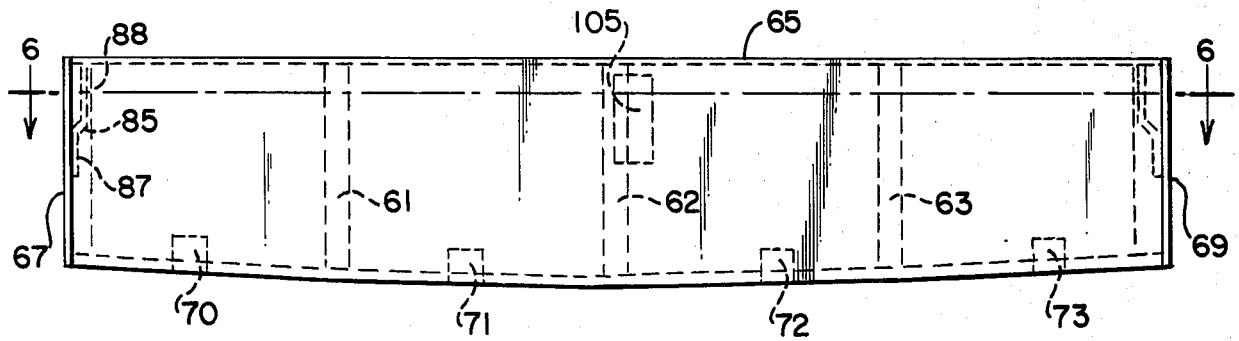
FIG. 5 is a lateral cross-section view showing the baffle portion of the apparatus of FIG. 2.
Figure 6:
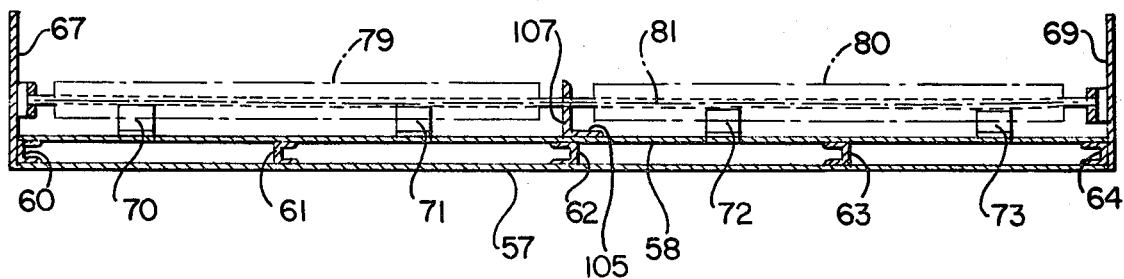
FIG. 6 is a section view taken along lines 6—6 in FIG. 5.

FIGS. 5 and 6 show some of the details of the baffle and the roller structure and its relationship with the feed tank 11'. Baffle 31 may be constructed in a number of different ways. In one embodiment, the baffle comprises two parallel sheets 57 and 58 of thin aluminum, typically ⅛th inch thick, compatible with the aluminum of the feed tank, and joined together by spaced vertical stiffeners 60–64. Such a structure is stiff but lightweight and has good insulating qualities. However, other types of construction can be used, such as a single piece of relatively thick aluminum plate.

The top edge 65 of the baffle is flat, while the other edges are configured to conform to the configuration of the interior surface of the feed tank. A typical feed tank has a curved bottom surface, so the lower edge of the baffle will likewise be curved. At each side edge of the baffle, two wing-like extensions 67 and 69 extend perpendicularly from the baffle forwardly of the feed tank, and are used to fasten the baffle to the feed tank. Adjacent the curved bottom edge of the baffle, clips 70–73 are used to secure the baffle to the bottom surface of the feed tank. A conventional flexible sealant is typically added to the bottom and side edges of the baffle in order to provide a watertight fit between the edges of the baffle and the feed tank.

Figure 7:
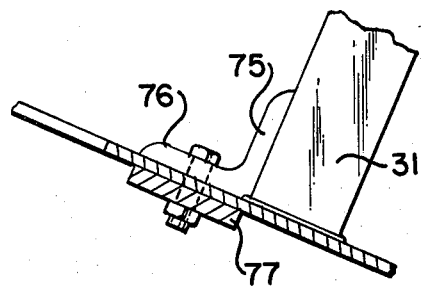
FIG. 7 is a partial longitudinal section view showing the clip-like bracing structure connecting the baffle of FIGS. 5 and 6 to the feed tank.

The structure of clips 70–73 is shown in FIG. 7. Each clip is generally L-shaped in configuration and is typically made of aluminum. The clip is approximately 1½ inches wide. Both horizontal and vertical portions of the L-shaped clip are approximately 1½ inches long. The vertical portion 75 is secured directly to the front surface of baffle 31, while the horizontal portion 76 is secured by a bolt and nut or the like through the bottom of the feed tank to a stiffener strap 77 which extends beneath the feed tank. In the embodiment shown, four such clips are used at spaced intervals across the width of the feed tank.

The wing-like extensions 67 and 69 and the clips 70-74 are used to draw the edges of the baffle 31 into close contact with the interior surface of the feed tank 5 and to provide a good seal. It should be understood, however, that other means may be used to secure the baffle to the feed tank.

The roller 37 in the embodiment shown comprises two roller sections 79 and 80 (FIG. 6), each of which cover slightly less than half the width of feed tank 11'. The roller sections 79 and 80 in the embodiment shown are constructed from plastic pipe, approximately 2⅜ inches in diameter, and turn on a ⅔ inch diameter stainless steel center shaft 81 which extends between the two opposing sides of the feed tank. The roller sections 79 and 80 are free to turn on center shaft 81, which provides support for the roller sections for the entire width of the feed belt.

Figure 8:
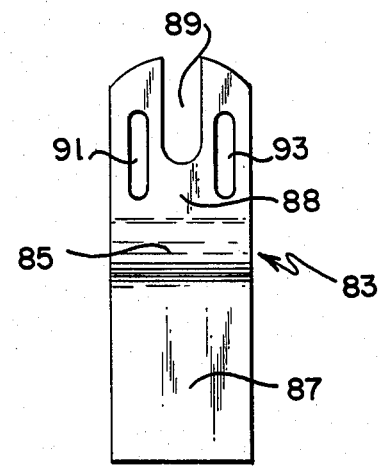
FIG. 8 is a front elevation view showing the side support for the roller portion of the present invention.
Figure 9:
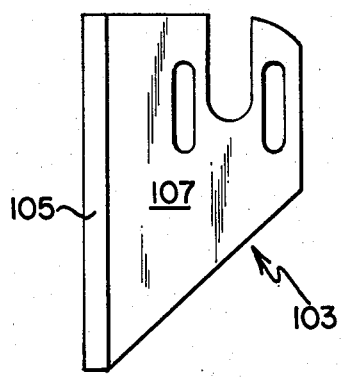
FIG. 9 is a front elevation view showing the middle support for the roller.
Figure 10:
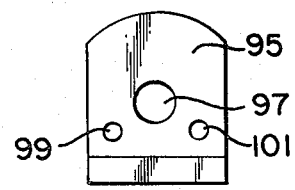
FIG. 10 is a front elevation view showing the lock for the side and middle supports of FIGS. 8 and 9.

The center shaft 81 is supported at both of its ends and its middle. The end and middle supports for shaft 81 are shown in FIGS. 8-10. The end supports 83 (FIG. 8) are plates of aluminum which have a mid-length angled section 85 and two flat, parallel end sections 87 and 88. The lower end section 87 is secured to a wing-like extension from the baffle, so that the upper end section 88 is spaced away from the surface of the wing-like extension, by virtue of angled section 85, as shown in FIG. 5. Three elongated vertical openings are located in the upper end section 87 of each end support. The middle opening 89 extends to the upper edge of the end support and is approximately the same width as the diameter of the center shaft 81, while the two outer openings 91 and 93, on either side of center opening 89, are wide enough to accommodate a small bolt or the like.

A center shaft support lock 95 (FIG. 10) is configured similar to the upper end section 88 of end support 83, with the exception that the three openings are circular, rather than elongated. The diameter of the middle opening 97 is approximately the same as the diameter of center shaft 81, while the diameter of the two outer openings 99 and 101 are approximately the same as the diameter of the small locking bolts (not shown). The center shaft support lock is placed against the end support, and two locking bolts are used to lock the end support 83, the support lock 95, and the center shaft in a fixed position.

When the two locking bolts are loosened, center shaft 81 and the support lock 95 may be moved vertically, with the locking bolts moving within the elongated openings in the end support 83. When the correct vertical position of the center shaft 81 is attained, the locking bolts are tightened, locking the support lock 95 against the end support, and positioning center shaft 81 in place.

The middle support 103 (FIG. 9) is an L-shaped plate, with one portion 105 mating against the front surface of the baffle approximately mid-length thereof, while the other portion 107 extends substantially perpendicularly forwardly therefrom, as shown in FIG. 6. Portion 107 includes three elongated openings or slots similar in configuration to those in the end supports. A support lock 95 is also used in conjunction with the middle support 103 to lock center shaft 81 in a particular vertical position relative to the holding tank. With such a structure, the vertical position of the roller sections may be conveniently varied, to accommodate the particular arrangement of the feed belt of a given holding tank. It should be understood, however, that other structural arrangements could be utilized to perform the same function.

Hence, a system has been described and shown which divides the feed tank portion of a shrimp processing apparatus into two sections, so that the water in the rear section may be conveniently and practically maintained at a low temperature and/or with a specified level of phosphates or other chemicals, which conditions improve the efficiency of the shrimp processing apparatus. The warm water runoff from the upper sprinklers and the cooker condensate is collected in, and removed from, the forward section, and thus is prevented from mixing with the water in the rear tank section.

Although a preferred embodiment of the invention has been disclosed for purposes of illustration, it should be understood that various changes, modifications and substitutions may be incorporated in such embodiment, as pointed out in some instances specifically above, without departing from the spirit of the invention, which is defined by the claims which follow.

I claim:

1. An improvement for a feed tank portion of a shrimp processing apparatus, wherein the shrimp processing apparatus in operation moves raw shrimp on a feed belt or the like from the feed tank to a shrimp cooker, and from there to a shrimp peeler, the improvement comprising:

means dividing the feed tank into forward and rear sections, the rear tank section having a sufficient capacity to function as a feed tank for the shrimp processing apparatus;

means for treating the water in the rear tank section such that the water has at least one of the following characteristics: (a) a selected temperature which is lower than ambient and (b) a desired concentration of a selected chemical;

wherein the dividing means is positioned so that the liquid condensate from the shrimp cooker and substantially any other untreated liquid runoff from the apparatus collects in the forward tank section, the liquid condensate and untreated liquid being thereby prevented from mixing with the water in the rear tank section.

2. A shrimp processing apparatus comprising:

a shrimp cooker;

a feed tank for temporarily holding shrimp;

a feed belt means for moving shrimp from the feed tank to the shrimp cooker;

means dividing the feed tank into forward and rear sections, the rear section having a sufficient capacity to function as a feed tank for the shrimp processing apparatus;

means for treating the water in the rear tank section such that it has at least one of the following characteristics: (a) a selected temperature which is lower than ambient and (b) a desired level of a selected chemical;

wherein the dividing means is positioned so that the liquid condensate from the shrimp cooker and substantially any other untreated liquid runoff from the apparatus collects in the forward tank section, the liquid condensate and untreated liquid being thereby prevented from mixing with the water in the rear tank section.

3. An apparatus of claim 1 or 2, wherein the bottom surface of the feed tank is upwardly tapered from the rear end to the forward end thereof, and wherein said dividing means is a baffle which is positioned approximately perpendicular to the bottom surface of the feed tank and forms a watertight seal therewith.

4. An apparatus of claim 3, wherein said baffle extends sufficiently upwardly that it pushes up the lower run of the feed belt, and wherein the apparatus includes a roller which is positioned in the vicinity of the upper forward edge of the baffle, over which the lower run of the feed belt slides.

5. An apparatus of claim 1 or 2, wherein said treating means includes a storage tank for water and means connecting the storage tank with the rear tank section, said treating means further including at least one of the following: means for cooling the water in the storage tank and means for adding a selected chemical to the water in the storage tank.

6. An apparatus of claim 1 or 2, wherein the shrimp processing apparatus includes first and second sprinklers for clearing the feed belt, the first sprinkler being near the upper end of the feed belt, in the vicinity of the shrimp cooker, and the second sprinkler being near the rear end of the feed belt, wherein said dividing means is positioned so that the liquid from the first sprinkler collects in the forward tank section while the liquid from the second sprinkler collects in the rear tank section.

* * * * *